(12) United States Patent
Matsumoto

(10) Patent No.: US 7,564,754 B2
(45) Date of Patent: Jul. 21, 2009

(54) DISK APPARATUS

(75) Inventor: Masaki Matsumoto, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 529 days.

(21) Appl. No.: 11/507,412

(22) Filed: Aug. 21, 2006

(65) Prior Publication Data

US 2007/0041305 A1 Feb. 22, 2007

(30) Foreign Application Priority Data

Aug. 22, 2005 (JP) ............................ P2005-239782

(51) Int. Cl.
*G11B 7/00* (2006.01)
(52) U.S. Cl. ................ 369/53.22; 369/53.3; 369/59.22; 369/124.15
(58) Field of Classification Search .............. 369/53.22, 369/53.3, 59.22, 124.15, 44.13, 44.26, 44.34, 369/44.39
See application file for complete search history.

(56) References Cited

U.S. PATENT DOCUMENTS

| | | | | |
|---|---|---|---|---|
| 5,251,194 | A * | 10/1993 | Yoshimoto et al. ........ | 369/44.26 |
| 5,283,776 | A * | 2/1994 | Takagi ...................... | 369/53.22 |
| 5,504,732 | A * | 4/1996 | Gregg et al. .............. | 369/53.27 |
| 5,796,685 | A * | 8/1998 | Noda et al. ............... | 369/44.28 |
| 6,381,201 | B1 * | 4/2002 | Shihara et al. ............ | 369/32.01 |
| 6,411,577 | B1 * | 6/2002 | Hirose ...................... | 369/53.22 |
| 6,963,521 | B2 * | 11/2005 | Hayashi .................... | 369/44.13 |
| 2002/0080701 | A1 * | 6/2002 | Nakajima ................. | 369/53.22 |
| 2003/0086347 | A1 * | 5/2003 | Kobayashi ................ | 369/53.22 |
| 2003/0090979 | A1 * | 5/2003 | Takahashi ................ | 369/53.22 |
| 2003/0151987 | A1 * | 8/2003 | Watanabe et al. ........ | 369/44.26 |
| 2004/0125713 | A1 * | 7/2004 | Takahashi et al. ........ | 369/44.34 |
| 2007/0025234 | A1 * | 2/2007 | Takazawa et al. ........ | 369/275.5 |

(Continued)

FOREIGN PATENT DOCUMENTS

JP 2000-285582 10/2000

(Continued)

OTHER PUBLICATIONS

Japanese Office Action for Japanese Application No. 2005-239782, mailed on May 22, 2008 (2 pages).

(Continued)

*Primary Examiner*—Thuy N Pardo
(74) *Attorney, Agent, or Firm*—Osha • Liang LLP

(57) ABSTRACT

A disk apparatus that includes: a first determining unit that determines whether the maximum value of an amplitude of an RF signal is a first reference level or more and the minimum value of the detected amplitude of the RF signal is a second reference level or less; a counting unit that counts the number of detected times of CAPA areas according to the determining results of the first determining unit; a second determining unit that determines whether the optical disk has been rotated a given amount or not; a third determining unit, when the optical disk has been rotated a given amount, determines whether the number of detected times of CAPA areas is at least equal to or larger than a given number of times or not; and a fourth determining unit that distinguishes the kind of the optical disk according to the determining results of the third determining unit.

6 Claims, 3 Drawing Sheets

U.S. PATENT DOCUMENTS

| | | | |
|---|---|---|---|
| 2007/0058503 A1* | 3/2007 | Watabe et al. | 369/44.39 |
| 2007/0097804 A1* | 5/2007 | Ando et al. | 369/30.07 |
| 2007/0097845 A1* | 5/2007 | Ando et al. | 369/275.3 |

FOREIGN PATENT DOCUMENTS

| | | |
|---|---|---|
| JP | 2000-315355 | 11/2000 |
| JP | 2001-34941 | 2/2001 |
| JP | 2002-83461 | 3/2002 |
| JP | 2004-46977 | 2/2004 |
| JP | 2005-38514 | 2/2005 |

OTHER PUBLICATIONS

Patent Abstracts of Japan, Publication No. 2004-046977, Publication Date Feb. 12, 2004 (2 pages).

Patent Abstracts of Japan, Publication No. 2000-285582, Publication Date Oct. 13, 2000 (2 pages).

Patent Abstracts of Japan, Publication No. 2000-315355, Publication Date Nov. 14, 2000 (2 pages).

Patent Abstracts of Japan, Publication No. 2005-038514, Publication Date Feb. 10, 2005 (2 pages).

* cited by examiner

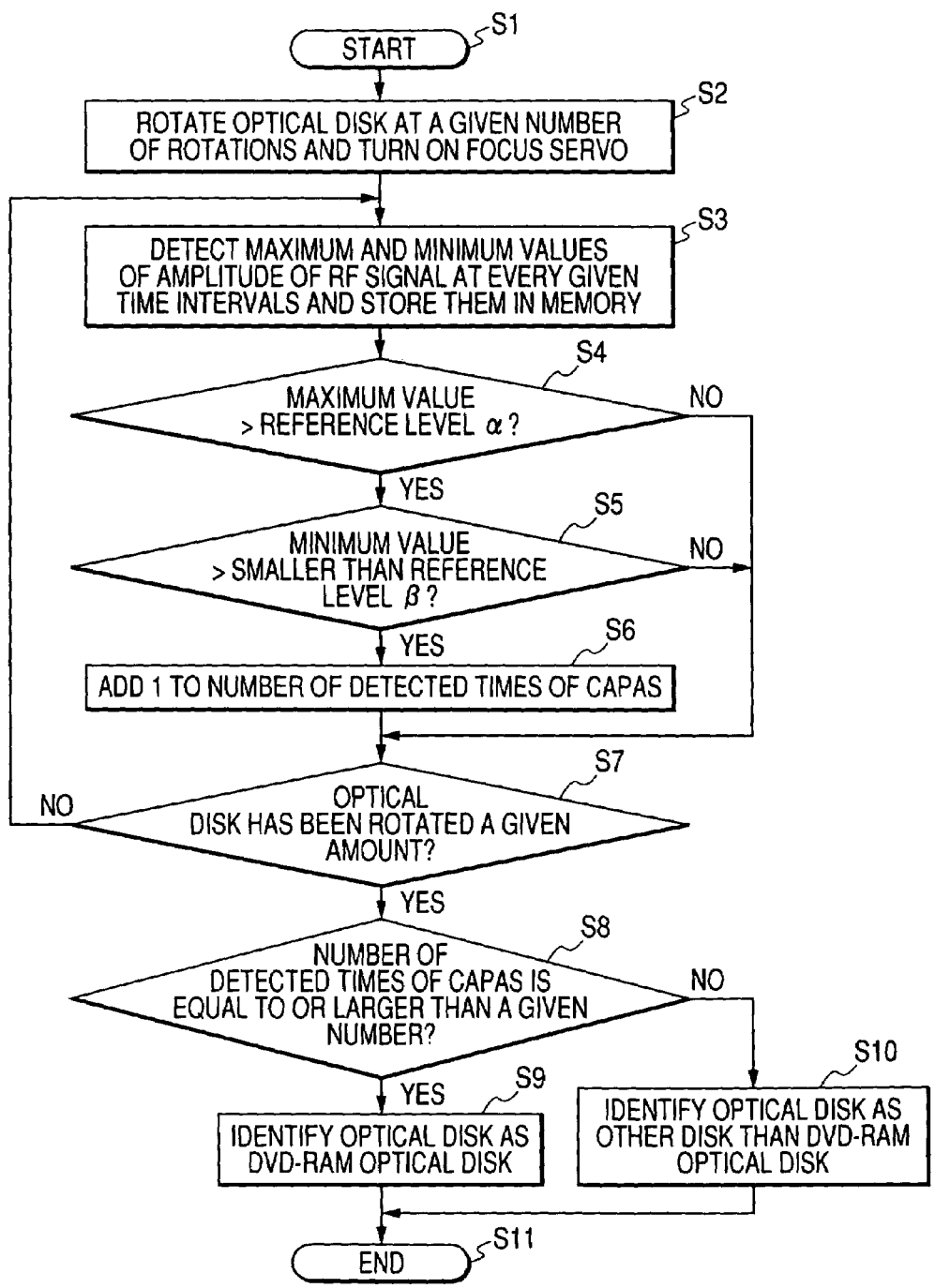

DISK APPARATUS

BACKGROUND OF THE INVENTION

1. Field of the Invention

The present invention relates to a disk apparatus for reproducing information data recorded in an optical disk such as a DVD (Digital Versatile Disk) and, more specifically, the invention relates to a disk apparatus capable of distinguishing the kinds of optical disks easily and accurately.

2. Description of the Related Art

In recent years, as a recoding medium for recording and reproducing information data, there has been used an optical disk having a large recording capacity. A rewritable optical disk includes not only a CD-RW (Compact Disk-ReWritable), a DVD-RW (ReWritable) and the like but also a DVD-RAM (Random Access Memory). However, the DVD-RAM is different in format from other optical disks: that is, a CAPA (Complimentary Allocated Pit Address) area and a data recording area are provided in each sector; in the data recording area, there are formed wobble-shaped grooves and lands; and, in the CAPA area, there are previously recorded address pits alternately at positions shifted by ½ track from each other with respect to the grooves or lands (see FIG. 2). Therefore, when reproducing information data recorded in the DVD-RAM, the signal processing of the disk apparatus must be adapted to the format of the DVD-RAM. Thus, it is necessary to distinguish whether an optical disk loaded into the disk apparatus is a DVD-RAM or other optical disks than the DVD-RAM, which makes it impossible to shorten the time for starting the reproduction of information data recorded in the optical disks.

As the background art, there is known a disk apparatus in which an optical pickup is swept in the focus direction to detect the peak and bottom values of the total internal reflection add signal of a reflected light received by the optical pickup, and the presence or absence of an address pit is checked to thereby distinguish the kinds of the optical disks (for example, see JP-A-2005-38514).

Also, conventionally, there is also known a disk apparatus in which the total internal reflection add signal of a reflected light received by an optical pickup is binarized, the presence or absence of an address pit is detected from the number of times of outputs of the binarized signals or from intervals between the outputs thereof, and the kinds of optical disks are distinguished according to the presence or absence of the address pit (for example, see JP-A-2004-46977).

Further, conventionally, there is known a disk apparatus in which an envelope signal is detected from an RF signal read out from an optical disk, the amplitude of the envelope signal is detected in an off tracking state, and, using the thus detected amplitude, the kind of the optical disk is distinguished (for example, see JP-A-2000-285582).

Moreover, conventionally, there is also known a disk apparatus in which whether an optical disk is an optical disk belonging to a specific kind or not is determined from a focus search level and, further, the kind of the optical disk is distinguished from the level of a focus error signal (for example, see JP-A-2000-315355).

SUMMARY OF THE INVENTION

In the first one of the above-cited conventional disk apparatuses, the optical pickup is swept in the focus direction to detect the peak and bottom values of the total internal reflection add signal of a reflected light received by the optical pickup, and the presence or absence of an address pit is determined to thereby be able to distinguish the kinds of the optical disks. In other words, this is a disk apparatus in which a reference level for determining the presence or absence of the address pit is decided by a difference between the peak and bottom values of the total internal reflection signal while the optical disk is stopped and, when the difference between the peak and bottom values of the total internal reflection signal while the optical disk is rotating is equal to or greater than the reference level, the optical disk is determined to be an optical disk having an address pit. Therefore, when the optical disk has a crack or is stained, there is found a problem that a wrong reference level can be decided by a difference between the peak and bottom values of the total internal reflection signal of the light reflected from the crack or stained part of the optical disk.

In the second conventional disk apparatus, the total internal reflection add signal of a reflected light received by an optical pickup is binarized, the presence or absence of an address pit is detected from the number of times of outputs of the binarized signals or from intervals between the outputs thereof, and the kinds of optical disks can be distinguished according to the presence or absence of the address pit. In other words, the total internal reflection add signals are binarized at such level as to be able to detect the address pit, the number of pulses of the binarized signals and intervals between them are measured, and the presence or absence of a previously set address pit is determined from the number of address pits and intervals between thereof in one round of the optical disk. Specifically, in the case of a DVD-RAM, the number of sectors of the inner peripheral side of the optical disk is different from that of the outer peripheral side thereof and also the number of address pits to be detected differs in every radius positions of the optical disk. Therefore, there is raised a problem that the number of address pits must be checked at every radius positions of the optical disk.

Also, in the third conventional disk apparatus, an envelope signal is detected from an RF signal read out from an optical disk, the amplitude of the envelope signal detected in the off tracking state, and, using the thus detected amplitude, the kind of the optical disk can be distinguished. In other words, in this disk apparatus, the amplitude of the envelope signal detected from the RF signal is compared with first and second reference levels for distinguishing optical disks having different RF signal amplitudes to thereby distinguish the kinds of the optical disks. Therefore, there is raised a problem that, when the quantity of light of the reflected light from the optical disk is small and the detected RF signal is small, it is difficult to distinguish the kinds of the optical disks accurately.

Further, in the fourth conventional disk apparatus, whether an optical disk is an optical disk belonging to a specific kind or not can be determined from a focus search level and, further, the kind of the optical disk can be distinguished according to the level of a focus error signal. However, this is a disk apparatus in which the optical disk is distinguished according to the amplitude level of a focus search signal detected at a focus zero cross position and further the kind of the optical disk is distinguished according to the level of the focus error signal. Therefore, there arises a problem that, when the quantity of light of the reflected light from the optical disk is small, it is difficult to distinguish the kinds of the optical disks accurately.

The present invention is made in view of the problems found in the above-mentioned conventional disk apparatus and thus the object of the invention is to provide a disk apparatus which, by detecting the presence or absence of a CAPA area, can distinguish the kinds of the optical disks easily and accurately.

According to the invention, there is provided a disk apparatus for reproducing information data recorded in an optical disk, comprising: signal level detect means for rotating an optical disk loaded into the disk apparatus at a given number of rotations and turning on a focus servo in the off state of a tracking servo to detect the amplitude of an RF signal read out from the optical disk by an optical pickup at every given time intervals; first determining means for determining whether the maximum value of the amplitude of an RF signal detected by the signal level detect means is equal to or larger than a first reference level and the minimum value of the detected amplitude of the RF signal is equal to or smaller than a second reference level or not; counting means for counting the number of detected times of CAPA areas according to the determining results of the first determining means; second determining means for determining whether the optical disk has been rotated a given amount or not; third determining means, when the second determining means determines that the optical disk has been rotated a given amount, for determining whether the number of detected times of CAPA areas counted by the counting means is at least equal to or larger than a given number of times or not; and, fourth determining means for distinguishing the kind of the optical disk according to the determining results of the third determining means.

The counting means, preferably, may be structured such that, when the first determining means determines that the maximum value of the amplitude of the RF signal detected by the signal level detect means is equal to or larger than the first reference level and the minimum value of the detected amplitude of the RF signal is equal to or smaller than the second reference level, it counts the number of RF signals, the amplitudes of which detected by the signal level detect means are each equal to or larger than the first reference level, as the number of detected times of CAPA areas.

The fourth determining means, preferably, may be structured such that, when the third determining means determines that the number of detected times of CAPA areas counted by the counting means is equal to or larger than a given number of times, it identifies the optical disk loaded into the disk apparatus as a DVD-RAM optical disk.

Also, the fourth determining means, preferably, may be structured such that, when the third determining means determines that the number of detected times of CAPA areas counted by the counting means is not equal to or larger than a given number of times, it identifies the optical disk loaded into the disk apparatus as other optical disk than the DVD-RAM optical disk.

Thanks to use of the above means, according to the invention, by detecting the presence or absence of a CAPA area, the kinds of optical disks can be distinguished easily and accurately.

According to a disk apparatus of the invention, an optical disk loaded into the disk apparatus is rotated at a given number of rotations; a focus servo is turned on in the off state of a tracking servo, the amplitude of an RF signal read out from the optical disk by an optical pickup is detected at every given time intervals; it is checked whether the maximum value of the detected amplitude of the RF signal is equal to or larger than a first reference level and the minimum value of the detected amplitude of the RF signal is equal to or smaller than a second reference level or not; when it is determined that the maximum value of the detected amplitude of the RF signal is equal to or larger than the first reference level and the minimum value of the detected amplitude of the RF signal is equal to or smaller than the second reference level, the number of RF signals detected each having an amplitude equal to or larger than the first reference level is counted as the number of detected times of CAPA areas; it is checked whether the optical disk has been rotated a given amount or not; when it is determined that the optical disk has been rotated a given amount, it is checked whether the number of detected times of CAPA areas counted is at least equal to or larger than a given number of times or not; when it is determined that the number of detected times of CAPA areas counted is equal to or larger than a given number of times, the optical disk loaded into the disk apparatus is identified as a DVD-RAM optical disk; and, when it is determined that the number of detected times of CAPA areas counted is not equal to or larger than a given number of times, the optical disk loaded into the disk apparatus is identified as other optical disk than the DVD-RAM optical disk. Thanks to this, according to the present invention, by detecting the presence or absence of the CAPA areas, the kinds of the optical disks can be distinguished easily and accurately.

According to a disk apparatus of the invention, an optical disk loaded into the disk apparatus is rotated at a given number of rotations; a focus servo is turned on in the off state of a tracking servo, the amplitude of an RF signal read out from the optical disk by an optical pickup is detected at every given time intervals; whether the maximum value of the detected amplitude of the RF signal is equal to or larger than a first reference level and the minimum value of the detected amplitude of the RF signal is equal to or smaller than a second reference level or not is checked; the number of detected times of CAPA areas is counted according to the checking results to thereby check whether the optical disk has been rotated a given amount; when it is determined that the optical disk has been rotated a given amount, it is checked whether the number of detected times of CAPA areas counted is equal to or larger than a given number of times; and, the kinds of the optical disks are distinguished according to the checking result. Thus, according to the present disk apparatus, by detecting the presence or absence of the CAPA areas, the kinds of the optical disks can be distinguished easily and accurately.

Also, according to a disk apparatus of the invention, when it is determined that the maximum value of the detected amplitude of the RF signal is equal to or larger than a first reference level and the minimum value of the detected amplitude of the RF signal is equal to or smaller than a second reference level, the number of RF signals the detected amplitudes of which are equal to or larger than the first reference level is counted as the number of detected times of the CAPA areas. Therefore, according to the present disk apparatus, by detecting the presence or absence of the CAPA area, the kinds of the optical disks can be distinguished easily and accurately.

Further, according to a disk apparatus of the invention, when it is determined that the number of detected times of CAPA areas counted is equal to or larger than a given number of times, an optical disk loaded into the disk apparatus is identified as a DVD-RAM optical disk. Therefore, according to the present disk apparatus, by detecting the presence or absence of the CAPA area, the kinds of the optical disks can be distinguished easily and accurately.

Moreover, according to a disk apparatus of the invention, when it is determined that the number of detected times of CAPA areas counted is not equal to or larger than a given number of times, an optical disk loaded into the disk apparatus is identified as other optical disk than a DVD-RAM optical disk. Therefore, according to the present disk apparatus, by detecting the presence or absence of the CAPA area, the kinds of the optical disks can be distinguished easily and accurately.

BRIEF DESCRIPTION OF THE DRAWINGS

FIG. 4 is a flow chart of the distinguishing operation.

DETAILED DESCRIPTION OF THE PREFERRED EMBODIMENTS

Figure 1:
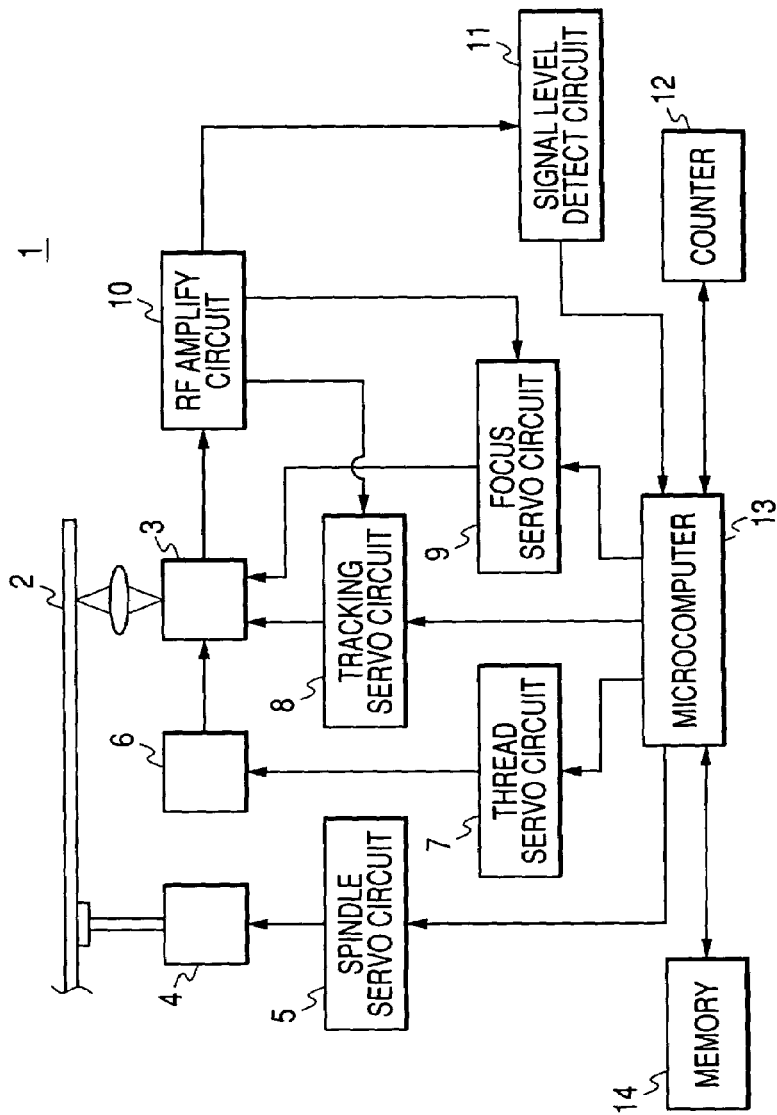
FIG. 1 is a block diagram of the structure of a disk apparatus according to an embodiment of the invention.
Figure 2:
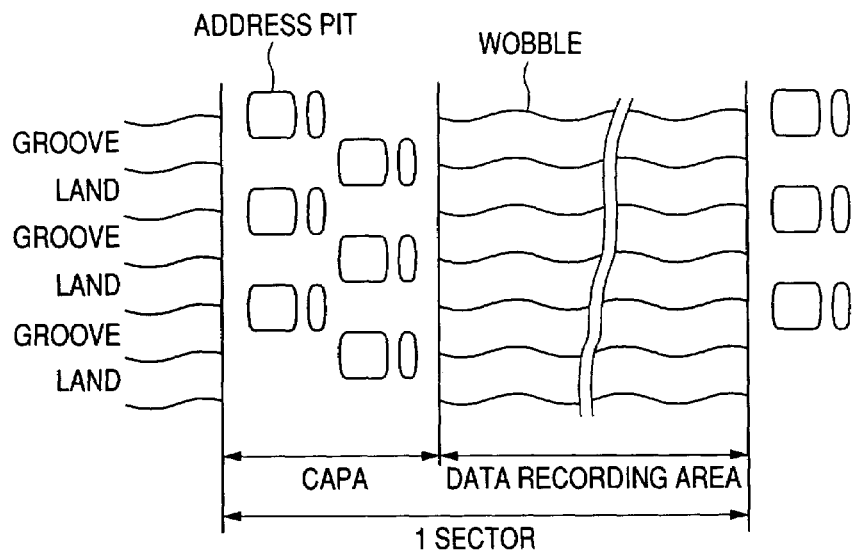
FIG. 2 is a typical view of a CAPA area and a data recording area of a DVD-RAM.
Figure 3A:
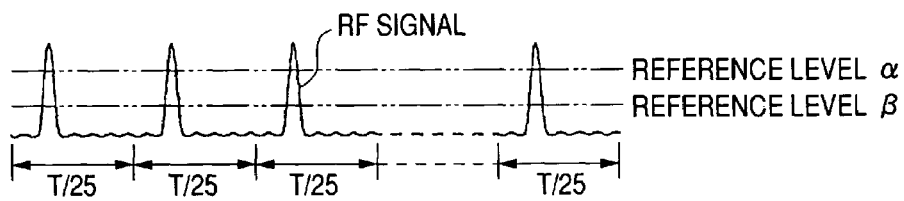
FIGS. 3A and 3B are explanatory views of a distinguishing operation of an optical disk by the disk apparatus.
Figure 3B:
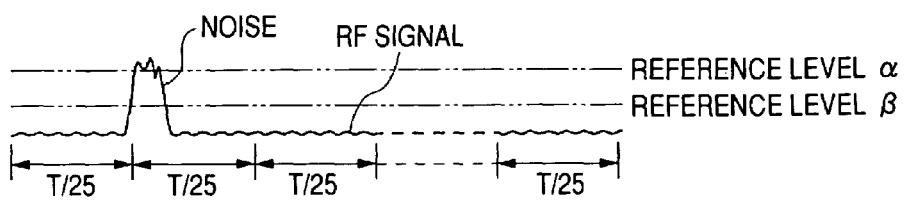

Now, description will be given below in detail of an embodiment of the invention with reference to the accompanying drawings. Specifically, FIG. 1 is a block diagram of the structure of a disk apparatus according to an embodiment of the invention. FIG. 2 is a typical view of a CAPA area and a data recording area of a DVD-RAM. FIGS. 3A and 3B are explanatory views of an optical disk distinguishing operation of the disk apparatus according to the embodiment of the invention. FIG. 4 is a flow chart of the optical disk distinguishing operation of the disk apparatus according to the embodiment of the invention.

Firstly, description will be given below of the structure of a disk apparatus with reference to a block diagram shown in FIG. 1. A disk apparatus 1 comprises an optical pickup 3 which radiates a laser beam onto an optical disk 2 to detect the reflected light of the optical disk 2 and reads information data recorded in the optical disk 2, a spindle motor 4 for rotating the optical disk 2, a spindle servo circuit 5 for servo controlling the rotation speed of the spindle motor 4, a thread motor 6 for moving the optical pickup 3 in the radial direction of the optical disk 2, a thread servo circuit 7 for servo controlling the rotation direction and rotation speed of the thread motor 6, a tracking servo circuit 8 for servo controlling the tracking of the optical pickup 3 according to a tracking error signal detected by the optical pickup 3, a focus servo circuit 9 for servo controlling the focus of the optical pickup 3 according to a focus error signal detected by the optical pickup 3, an RF amplify circuit 10 for amplifying an RF (Radio Frequency) signal on information data read out from the optical disk 2 by the optical pickup 3, a signal level detect circuit 11 for detecting the maximum value and minimum value of the amplitude of the RF signal amplified by the RF amplify circuit 10, a counter 12 for counting the number of detected times of a CAPA (Complimentary Allocated Pit Address) areas, a microcomputer 13 for controlling the whole system of the disk apparatus 1, and a memory 14 for storing the maximum and minimum values of the amplitude of the RF signal detected by the signal level detect circuit 11.

Now, description will be given below of the operation of the above structured disk apparatus.

When the optical disk 2 is loaded into the disk apparatus 1, the microcomputer 13 issues a control signal to the spindle servo circuit 5 to drive the spindle motor 4 to thereby rotate the optical disk 2 at a given number of rotations; and also, the microcomputer 13 issues a control signal to the focus servo circuit 9 to turn on the focus servo of the optical pickup 3; in the off state of the tracking servo, the microcomputer 13 actuates the signal level detect circuit 11 to detect the amplitude of the RF signal read out from the optical disk 2 by the optical pickup 3 at every given time intervals, for example, when the number of sectors in the inner-most inner periphery of a DVD-RAM is 25, at every T/25 time intervals (T: the rotation cycle of the optical disk) (see FIGS. 3A and 3B); and, the microcomputer 13 stores the maximum and minimum values of the amplitude of the RF signal detected by the signal level detect circuit 11 in the memory 14.

The microcomputer 13 determines whether the maximum value of the amplitude of the RF signal stored in the memory 14 is equal to or greater than a given reference level $\alpha$ and the minimum value of the amplitude of the RF signal is equal to or smaller than a given reference level $\beta$ or not. When it is found that the maximum value of the amplitude of the RF signal is equal to or greater than a given reference lever $\alpha$ and the minimum value of the amplitude of the RF signal is equal to or smaller than a given reference value $\beta$ (see FIGS. 3A and 3B), the microcomputer 13 issues a control signal to the counter 12 to thereby add 1 to the number of detected times of the CAPA areas. When the optical disk 2 is a DVD-RAM, in the CAPA area in which an address pit is present, the amplitude of the RF signal of the reflected light from the optical disk 2 becomes equal to or greater than the given reference level $\alpha$; and, in the data recording area where no address pit is present, the amplitude of the RF signal of the reflected light from the optical disk 2 becomes equal to or smaller than the given reference value $\beta$, and the number of detected times of the CAPA area is added at least once at every given time intervals (see FIG. 3A). Also, when the optical disk 2 is other optical disks than the DVD-RAM, even if the amplitude of the RF signal of the reflected light from the optical disk 2 becomes equal to or greater than the given reference level $\alpha$ due to the crack or stain of the optical disk 2, the number of detected times of the CAPA area is not added at every given time intervals (see FIG. 3B).

The microcomputer 13 checks whether the optical disk 2 has been rotated a given amount, for example, one time. When it is found that the optical disk has been rotated a given amount, the microcomputer 13, when the number of detected times of the CAPA areas counted by the counter 12 is equal to or larger than a given number of times, for example, when the number of sectors is 25 in the inner-most inner periphery of the DVD-RAM for one rotation of the optical disk 2, checks whether the CAPA area has been detected at least 25 times or not; and, when the CAPA area has been detected a given number of times or more, the microcomputer 13 determines that the optical disk 2 loaded into the disk apparatus 1 is a DVD-RAM optical disk. Also, when the CAPA area has not been detected a given number of times or more, the microcomputer 13 determines that the optical disk 2 loaded into the disk apparatus 1 is an optical disk other than a DVD-RAM optical disk. In this manner, according to the present embodiment, by checking the number of detected times of CAPA areas, the kinds of the optical disks can be distinguished easily and accurately.

Now, description will be given below of the distinguishing operation of the optical disk by a disk apparatus according to the embodiment of the invention with reference to a flow chart shown in FIG. 4.

When the optical disk is loaded into the disk apparatus, the processing goes from Step S1 to Step S2 and, in Step S2, the optical disk is rotated a given number of times and, in the off state of the tracking servo, the focus servo of the optical pickup is turned on and the processing advances to Step S3.

In Step S3, the maximum and minimum values of the amplitude of the RF signal are detected at every given time intervals, the maximum and minimum values of the amplitude of the RF signal detected at every given time intervals are stored in the memory and, after that, the processing advances to Step S4.

In Step S4, it is checked whether the maximum value of the amplitude of the RF signal stored in the memory is equal to or larger than a given reference level α or not. When it is found that the maximum value of the amplitude of the RF signal is equal to or larger than the given reference level α, the processing advances to Step S5. When the maximum value of the amplitude of the RF signal is not equal to or larger than the given reference level α, the processing advances to Step S7.

In Step S5, it is checked whether the minimum value of the amplitude of the RF signal stored in the memory is equal to or smaller than a given reference level β or not. When it is found that the minimum value of the amplitude of the RF signal is equal to or smaller than the given reference level β, the processing advances to Step S6. When the minimum value of the amplitude of the RF signal is not equal to or smaller than the given reference level β, the processing advances to Step S7.

Incidentally, the reference level α may be set to 1 (V), and the reference level β may be set to 0.5 (V), for example. It is preferable that the difference between levels α and β is 0.3-0.7 (V). More preferably, the difference is 0.5 (V).

In Step S6, 1 is added to the number of detected times of CAPA areas and the processing advances to Step S7.

In Step S7, it is checked whether the optical disk has been rotated a given amount or not. When it is found that the optical disk has been rotated a given amount, the processing advances to Step S8. When the optical disk has not been rotated a given amount, the processing goes back to Step S3 and the processings in the respective steps 3 to 7 are repeated.

In Step S8, it is checked whether the number of detected times of CAPA areas is equal to or larger than a given number or not. When the number of detected times of CAPA areas is found equal to or larger than the given number, the processing goes to Step S9. When the number of detected times of CAPA areas is found not equal to or larger than the given number, the processing goes to Step S10. The given number may be set to 15 or more, for example.

In Step S9, it is determined that the optical disk loaded into the disk apparatus is a DVD-RAM optical disk, and the processing advances to Step S11, where the processing is ended.

In Step S10, it is determined that the optical disk loaded into the disk apparatus is other optical disk than the DVD-RAM optical disk, and the processing advances to Step S11, where the processing is ended.

Although description has been given heretofore in detail of the embodiment of the invention, the invention is not limited to this but it goes without saying that various changes and modifications are also possible in the range of the ordinary knowledge of persons who are skilled in the art.

What is claimed is:

1. A disk apparatus for reproducing information data recorded in an optical disk, comprising:
   signal level detect means for rotating an optical disk loaded into the disk apparatus at a given number of rotations and turning on a focus servo in the off state of a tracking servo to detect the amplitude of an RF signal read out from the optical disk by an optical pickup at every given time intervals;
   first determining means for determining whether the maximum value of the amplitude of an RF signal detected by the signal level detect means is equal to or larger than a first reference level and the minimum value of the detected amplitude of the RF signal is equal to or smaller than a second reference level or not;
   counting means, when the first determining means determines that the maximum value of the amplitude of the RF signal detected by the signal level detect means is equal to or larger than the first reference level and the minimum value of the detected amplitude of the RF signal is equal to or smaller than the second reference level, for counting the number of RF signals the amplitudes of which detected by the signal level detect means are equal to or larger than the first reference level as the number of detected times of CAPA (Complimentary Allocated Pit Address) areas;
   second determining means for determining whether the optical disk has been rotated a given amount or not;
   third determining means, when the second determining means determines that the optical disk has been rotated a given amount, for determining whether the number of detected times of CAPA (Complimentary Allocated Pit Address) areas counted by the counting means is at least equal to or larger than a given number of times or not; and
   fourth determining means, when the third determining means determines that the number of detected times of CAPA (Complimentary Allocated Pit Address) areas counted by the counting means is equal to or larger than a given number of times, for identifying the optical disk loaded into the disk apparatus as a DVD-RAM optical disk and, when the third determining means determines that the number of detected times of CAPA (Complimentary Allocated Pit Address) areas counted by the counting means is not equal to or larger than a given number of times, for identifying the optical disk loaded into the disk apparatus as other optical disk than the DVD-RAM optical disk.

2. A disk apparatus for reproducing information data recorded in an optical disk, comprising:
   signal level detect means for rotating an optical disk loaded into the disk apparatus at a given number of rotations and turning on a focus servo in the off state of a tracking servo to detect the amplitude of an RF signal read out from the optical disk by an optical pickup at every given time intervals;
   first determining means for determining whether the maximum value of the amplitude of an RF signal detected by the signal level detect means is equal to or larger than a first reference level and the minimum value of the detected amplitude of the RF signal is equal to or smaller than a second reference level or not;
   counting means for counting the number of detected times of CAPA (Complimentary Allocated Pit Address) areas according to the determining results of the first determining means;
   second determining means for determining whether the optical disk has been rotated a given amount or not;
   third determining means, when the second determining means determines that the optical disk has been rotated a given amount, for determining whether the number of detected times of CAPA (Complimentary Allocated Pit Address) areas counted by the counting means is at least equal to or larger than a given number of times or not; and
   fourth determining means for distinguishing the kind of the optical disk according to the determining results of the third determining means.

3. The disk apparatus as set forth in claim 2, wherein the counting means is counting means which, when the first determining means determines that the maximum value of the amplitude of the RF signal detected by the signal level detect means is equal to or larger than the first reference level and the minimum value of the detected amplitude of the RF signal is equal to or smaller than the second reference level, counts the number of RF signals the amplitudes of which detected by the signal level detect means are equal to or larger than the first reference level as the number of detected times of CAPA (Complimentary Allocated Pit Address) areas.

4. The disk apparatus as set forth in claim 2, wherein the fourth determining means is determining means which, when the third determining means determines that the number of detected times of CAPA (Complimentary Allocated Pit Address) areas counted by the counting means is equal to or larger than a given number of times, identifies the optical disk loaded into the disk apparatus as a DYD-RAM optical disk.

5. The disk apparatus as set forth in claim 2, wherein the fourth determining means is determining means which, when the third determining means determines that the number of detected times of CAPA (Complimentary Allocated Pit Address) areas counted by the counting means is not equal to or larger than a given number of times, identifies the optical disk loaded into the disk apparatus as other optical disk than the DVD-RAM optical disk.

6. A disk apparatus for reproducing information data recorded in an optical disk, comprising:
 a signal level detect unit that rotates an optical disk loaded into the disk apparatus at a given number of rotations and turns on a focus servo in the off state of a tracking servo to detect the amplitude of an RF signal read out from the optical disk by an optical pickup at every given time intervals;
 a first determining unit that determines whether the maximum value of the amplitude of an RF signal detected by the signal level detect unit is equal to or larger than a first reference level and the minimum value of the detected amplitude of the RF signal is equal to or smaller than a second reference level or not;
 a counting unit that counts the number of detected times of CAPA (Complimentary Allocated Pit Address) areas according to the determining results of the first determining unit;
 a second determining unit that determines whether the optical disk has been rotated a given amount or not;
 a third determining unit, when the second determining unit determines that the optical disk has been rotated a given amount, determines whether the number of detected times of CAPA (Complimentary Allocated Pit Address) areas counted by the counting unit is at least equal to or larger than a given number of times or not; and
 a fourth determining unit that distinguishes the kind of the optical disk according to the determining results of the third determining unit.

* * * * *